United States Patent Office 3,065,864
Patented Nov. 27, 1962

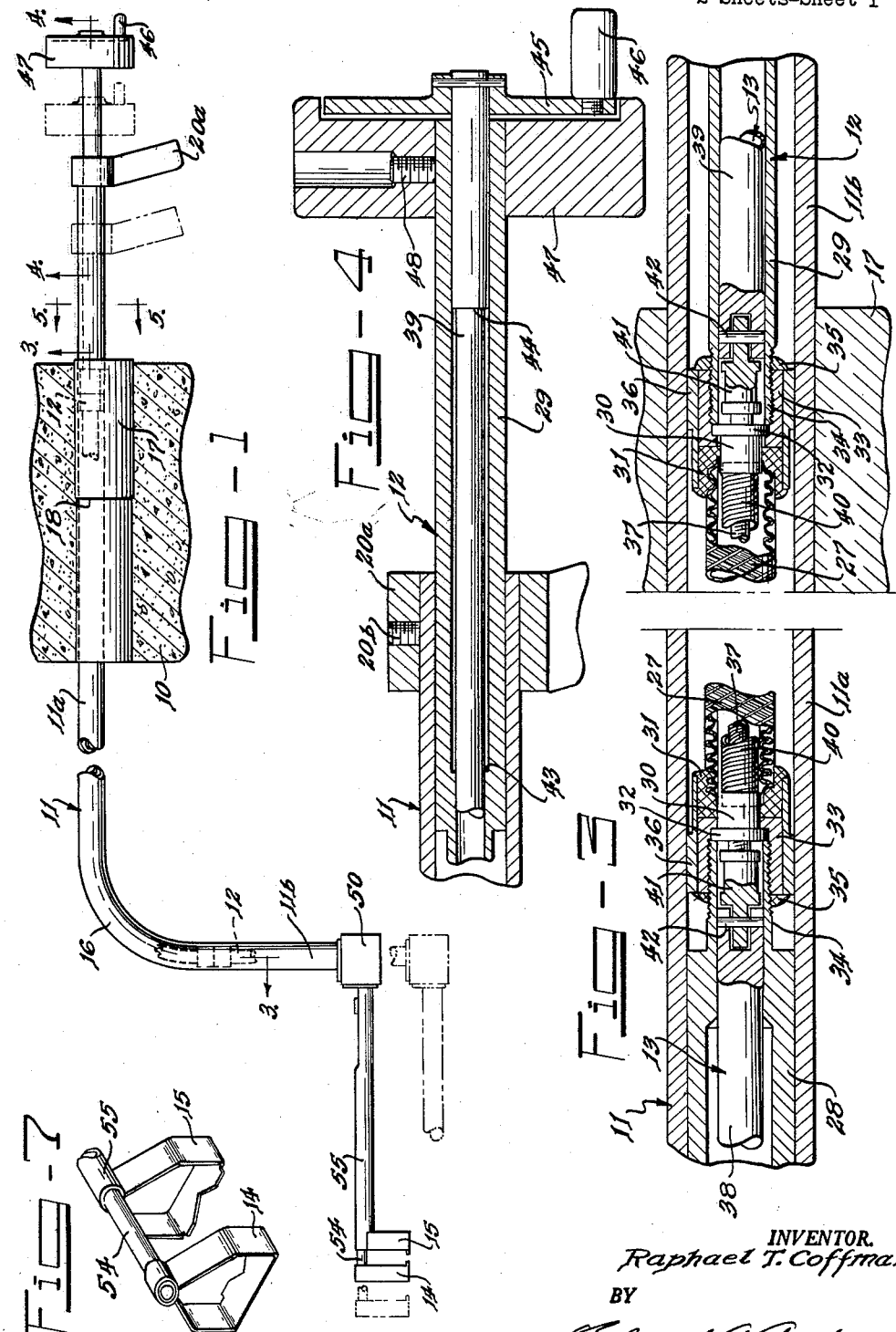

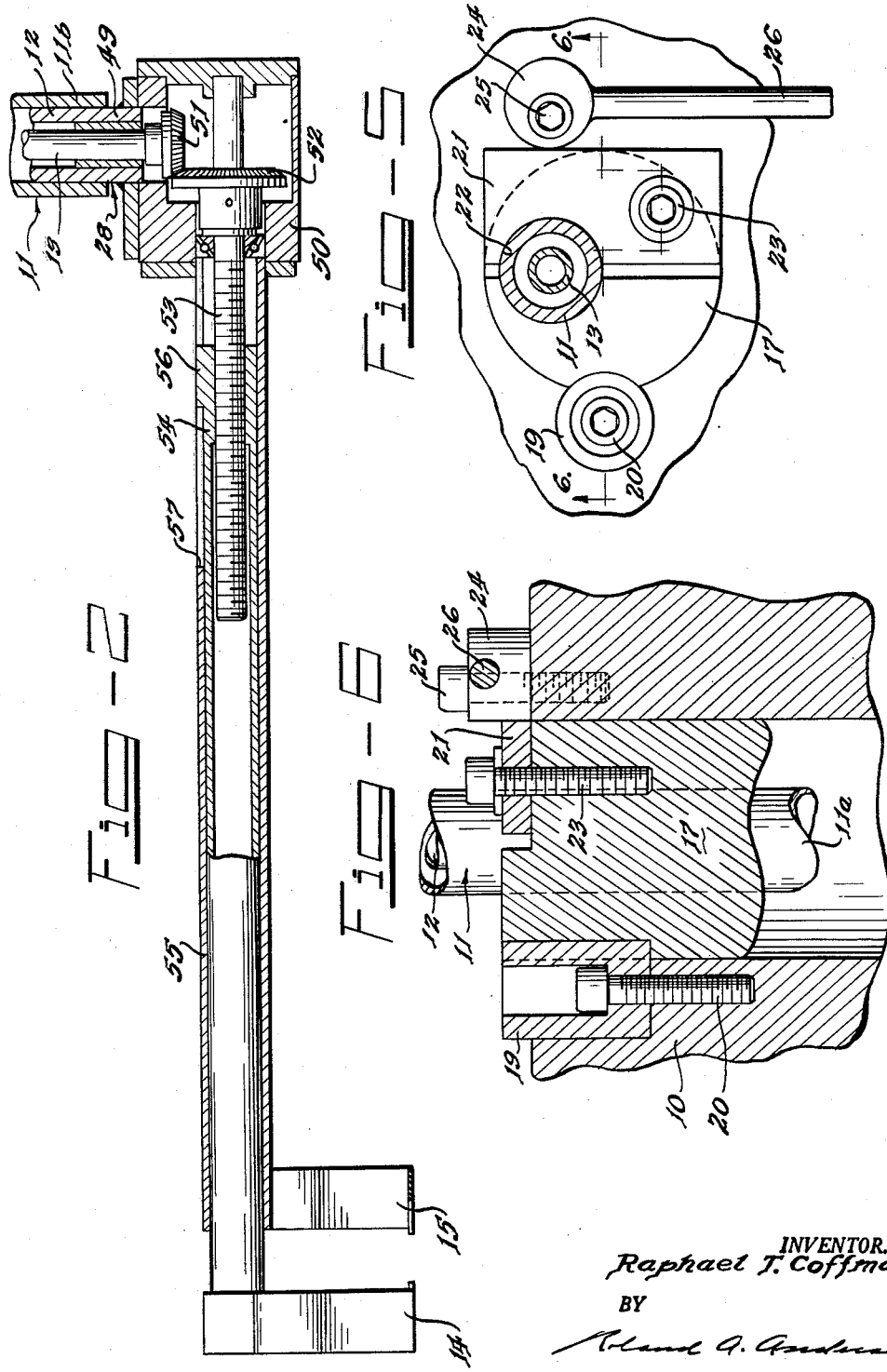

3,065,864
REMOTE CONTROL MANIPULATOR
Raphael T. Coffman, Richland, Wash., assignor to the United States of America as represented by the United States Atomic Energy Commission
Filed Feb. 24, 1961, Ser. No. 91,559
2 Claims. (Cl. 214—1)

This invention relates to a remote-control manipulator for handling objects from behind a shielding wall. More particularly, the invention involves a manipulator of the above type in which a flexible shaft plays an important role.

Manipulators of the present type are used to handle objects under conditions where harmful radiation prevents direct handling. In general, such manipulators need to have a range of movement in three dimensions and means for opening and closing gripping jaws that hold the objects being handled. A manipulator fulfilling these requirements can easily be costly, complicated, unwieldy, and difficult to repair or maintain.

The present manipulator has the necessary three-dimensional movement and control of gripping jaws while being relatively low in cost and simple in construction and operation. This manipulator has two flexible shafts and a bent tube receiving them; the shafts have individual and joint rotation and joint longitudinal movement, and the tube having longitudinal movement and rotation.

In the drawings:

FIG. 1 is an elevation, partly in section, showing the manipulator of the present invention mounted in a shielding wall;

FIG. 2 is a fragmentary sectional view showing the end of the manipulator to which gripping jaws are attached;

FIG. 3 is a sectional view taken on the line 3—3 of FIG. 1 and showing details of flexible shafts of the manipulator;

FIG. 4 is a sectional view taken on the line 4—4 of FIG. 1 and showing the operator's end of the manipulator;

FIG. 5 is a view taken on the line 5—5 of FIG. 1 and showing mounting and holding means for the manipulator;

FIG. 6 is a sectional view taken on the line 6—6 of FIG. 1 and showing the same mounting and holding means; and Fig. 7 is a fragmentary perspective view showing gripping jaws of the manipulator.

As shown in FIGS. 1–4, the present manipulator, mounted to extend through a shielding wall 10, comprises a bent tube 11 with angularly related portions 11a and 11b, a hollow flexible shaft 12 within the tube 11, an inner flexible shaft 13 within the shaft 12, and gripping jaws 14 and 15. The jaws 14 and 15 are moved parallel to the wall 10 by joint longitudinal movement of the shafts 12 and 13 with respect to the tube 11; are moved toward and away from the wall 10 by longitudinal movement of the tube portion 11a in the wall; are rotated about the tube portion 11a by rotation of the same; are rotated about the tube portion 11b by joint rotation of the shafts 12 and 13; and are opened and closed by rotation of the inner shaft 13 with respect to the outer shaft 12.

The tube portions 11a and 11b extend substantially at right angles to one another and are joined by a curved region 16 of the tube 11. The tube portion 11b extends substantially parallel to the wall 10. The tube portion 11a extends substantially at right angles to the wall 10 and is mounted in a support 17, which is placed in the wall. The support 17 has a shoulder 18 which engages a shoulder in the wall 10 and thus enables a retainer 19 to fix the support 17 in the wall 10. As shown in FIGS. 5 and 6, the retainer 19 has the shape of a right circular cylinder, fits in a correspondingly shaped recess formed partly in the retainer 19 and mainly in the wall 10, and is held in place by a screw 20 going through the base of the retainer 19 and threaded into the wall 10.

The tube 11 is adapted to move in the support 17 longitudinally of the tube portion 11a or rotationally about the tube portion 11a as an axis. As shown in FIGS. 1 and 4, a handle, 20a, secured to the end of the tube portion 11a by a set screw 20b, is used for moving the tube 11 as just stated. The tube 11 is adapted to be held against longitudinal movement and rotation by a plate 21, which has an arcuate recess 22 engageable with the tube portion 11a and is pivotally mounted on the support 17 on a screw 23. The plate 21 is held against the tube portion 11a by a circular cam 24, which is rotatably mounted on the wall 10 by a screw 25 and operated by a rod 26 extending generally radially from the cam 24.

As shown in FIG. 3, the outer hollow shaft 12 comprises a flexible section 27 of considerable length and rigid or inflexible end sections 28 and 29 attached thereto. The flexible section 27, which extends through the curved region 16 of the tube 11 and through a considerable portion of one or both of the straight portions 11a and 11b of the tube, is formed of a metallic flexible hose of corrugated shape covered with a metal braid and is joined at its ends to ferrules 30 by masses of solder 31. Enlarged heads 32 on the ferrules 30 are clamped between threaded rings 33 and reduced threaded ends 34 on the rigid end sections 28 and 29. Each ring 33 has threaded engagement with the associated reduced end 34 and is attached thereto by a ring of solder 35, which incidentally serves to attach a bushing 36, one at each end of the flexible section 27. The bushings 36 slidably engage the tube portions 11a and 11b.

The inner shaft 13 comprises a flexible section 37 and rigid or inflexible end sections 38 and 39. The flexible section 37, which takes the form of a cable, is generally coextensive with, and a little longer than, the flexible section 27 of the outer shaft 12 and extends freely through the ferrules 30 to head members 41, to which the ends of the flexible section 37 are joined. A flexible tubular covering 40 for the flexible section 37 is attached at its ends to the ferrules 30. The head members 41 are connected by pins 42 to the ends of the rigid sections 38 and 39.

As shown in FIGS. 3 and 4, the end section 29 of the outer shaft 12 and the end section 39 of the inner shaft 13 relatively closely fit one another at regions near the flexible sections 27 and 37. At an intermediate region the internal diameter of the end section 29 becomes abruptly larger so that an internal shoulder 43 is formed in the end section 29, which shoulder cooperates with a shoulder 44 to limit movement of the inner shaft 13 with respect to the outer shaft 12 to the left as viewed in FIG. 4 in the event of release of the inner shaft 13. To the right of the shoulder 44 the end section 39 has a relatively close fit in the end section 29. A plate 45 carrying a handle 46 is pinned to the free end of the end section 39. The handle 46 rotates the inner shaft 13. A circular member 47, fastened by a set screw 48, is used for moving the outer shaft 12. The plate 45 fits in a recess in the member 47. Engagement of the plate 45 and member 47 limits movement of the inner shaft 13 with respect to the outer shaft 12 to the left as viewed in FIG. 4.

As shown in FIG. 3, the end section 28 has a relatively close fit with the end section 38 adjacent the flexible sections 27 and 37, and elsewhere the end sections 28 and 38 are spaced from one another. As shown in FIG. 2, a bushing 49 is provided to journal the end section 38 in the end section 28 adjacent the free end of the tube portion 11b. A gear casing 50, which houses meshing bevel gears 51 and 52, is secured as by welding to the free end of the end section 28 so as to be supported thereby. Gear 51 is attached to the free end of the end section 38, and the gear 52 is attached to a screw 53. The screw is journaled in the casing 50 and extends therefrom into threaded engagement with one end of an elongated nonrotatable nut 54. To the other end of the nut 54 the jaw 14 is attached. The jaw 15 is attached to one end of a sleeve 55, which embraces the elongated nut 54 and is secured at its other end to the gear casing 50. The elongated nut 54 is nonrotatable, because a projection 56 thereon rides in a longitudinal slot 57 in the sleeve 55. Rotation of the inner shaft 13 with respect to the outer shaft 12 is transmitted through the gears 51 and 52 to the screw 53. Since the elongated nut 54 cannot rotate, it must necessarily be moved longitudinally by rotation of the screw 53. Thus, the jaw 14 is moved toward or away from the jaw 15.

The radius at which the present manipulator operator, i.e., the distance of the jaws 14 and 15 from the axis of the tubular portion 11a, is increased by longitudinal movement of the inner and outer shafts 12 and 13 to the left as viewed in FIGS. 1 and 4. The result is that the end sections 28 and 38 of shafts 12 and 13 are made to extend from the tubular portion 11b and the gear casing 50 to move away from the end of the tubular portion 11b. The end sections 28 and 38 can protrude from the tubular portion 11b without interfering with the work of the jaws 14 and 15, because the end section 28 has a relatively close fit with the tube portion 11b and the end section 28 is rigid so as to act as a lengthener of the tubular portion 11b.

In order for the inflexible portions 28 and 38 of the shafts 12 and 13 to protrude from the tube portion 11b as just stated, the shafts 12 and 13 must have a longer straight length than the tube 11. Consequently, when as indicated by the full-line position of FIG. 1 the gear casing 50 is directly adjacent the free end of the tube portion 11b, the end sections 29 and 39 of the shafts 12 and 13 must protrude from the tube portion 11a. Since end section 29 is rigid and has a relatively close fit with the tube portion 11a, the end sections 29 and 39 may protrude therefrom without interfering with movement or adjustment of the jaws 14 and 15.

The flexible sections 27 and 37 of the shafts 12 and 13 are shown as considerably longer than that of the curved region 16 of the tube 11, and it is to be understood that the flexible sections 27 and 37 must be at least as long as the curved region 16 plus the amount by which the end sections 29 and 39 of shafts 12 and 13 are to protrude from tube portion 11b when the jaws 14 and 15 are at a maximum distance from the axis of the tube portion 11a.

It is also understood that the invention is not to be limited by the details given herein but that it may be modified within the scope of the appended claims.

What is claim is:

1. A remote-control manipulator comprising a stiff tube having one end portion extending at an angle to an intermediate portion and joined thereto by a curved region, means for mounting the intermediate portion of the tube in a wall to locate the said one end portion on one side of the wall and the other end portion on the other side thereof and to enable the tube to be moved about and along the axis of the intermediate portion, an outer hollow shaft mounted in and extending through the tube for rotation and longitudinal movement with respect thereto and having an inflexible end section adjacent the said one end portion of the tube and a flexible section extending from the inflexible end section through the curved region of the tube, a gear casing secured to the inflexible end section of the outer shaft and located exterior to the tube, a pair of meshing bevel gears in the casing, a sleeve secured at one end to the gear casing and extending therefrom at an angle to the said one end portion of the tube, a pair of cooperating jaws, one jaw being secured to the other end of the sleeve, an elongated nut having one end secured to the other jaw and being mounted in the sleeve so as to be longitudinally movable with respect thereto and to be prevented from rotating with respect thereto, a screw having threaded engagement with the other end of the nut and being rotatably mounted in the gear casing, means securing the screw to one of the gears, an inner shaft mounted in and extending through the outer shaft for rotation with respect thereto and having a flexible section located in the curved region of the tube, and means securing the inner shaft to the other of the gears.

2. The manipulator specified in claim 1, the elongated nut being permitted longitudinal movement and denied rotation with respect to the sleeve by virtue of a projection on the nut and a longitudinal slot in the sleeve receiving the projection.

References Cited in the file of this patent

UNITED STATES PATENTS

| | | |
|---|---|---|
| 2,765,930 | Greer et al. | Oct. 9, 1956 |
| 2,861,700 | James | Nov. 25, 1958 |